Jan. 15, 1963 H. SAWYER, JR., ETAL 3,073,366
PINEAPPLE PROCESSING MACHINE
Filed Sept. 9, 1958 10 Sheets-Sheet 1

INVENTORS.
Houghton Sawyer Jr.
Kenneth T. Yoshiura
BY
Byron Hume Groen Clement
Attys.

Jan. 15, 1963 H. SAWYER, JR., ETAL 3,073,366
PINEAPPLE PROCESSING MACHINE
Filed Sept. 9, 1958 10 Sheets-Sheet 4

INVENTORS
Houghton Sawyer Jr.
Kenneth T. Yoshiura
BY
Attys.

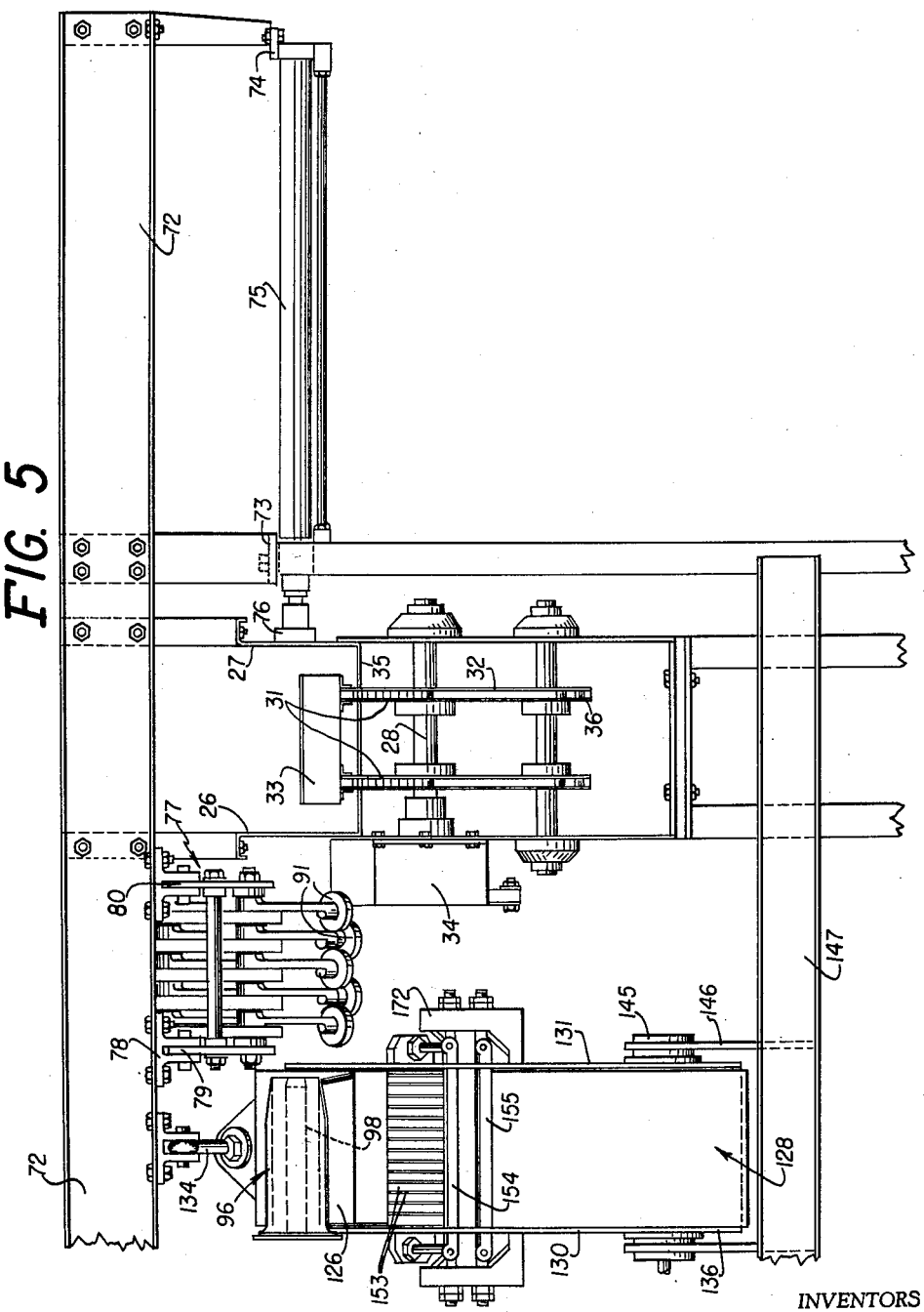

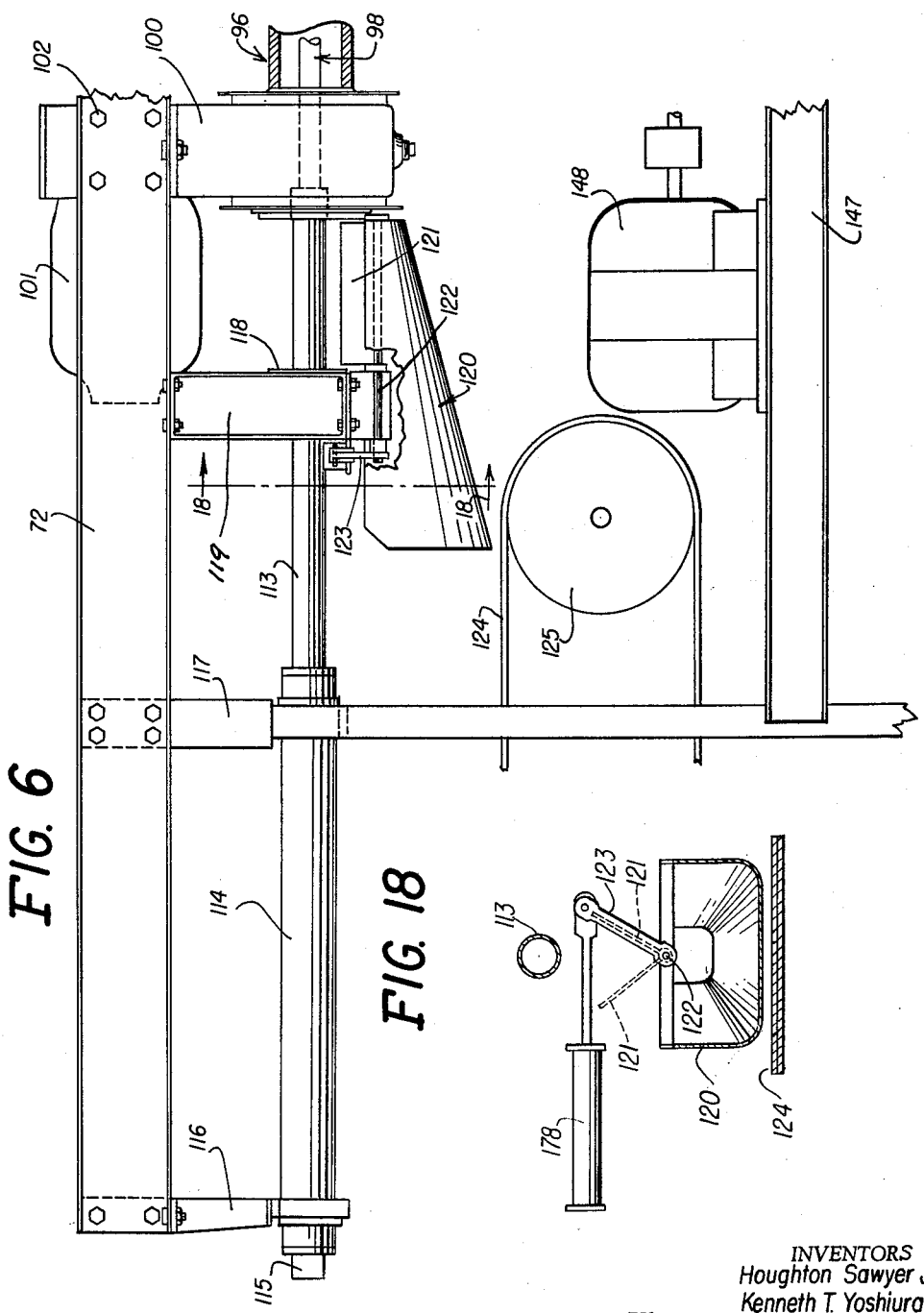

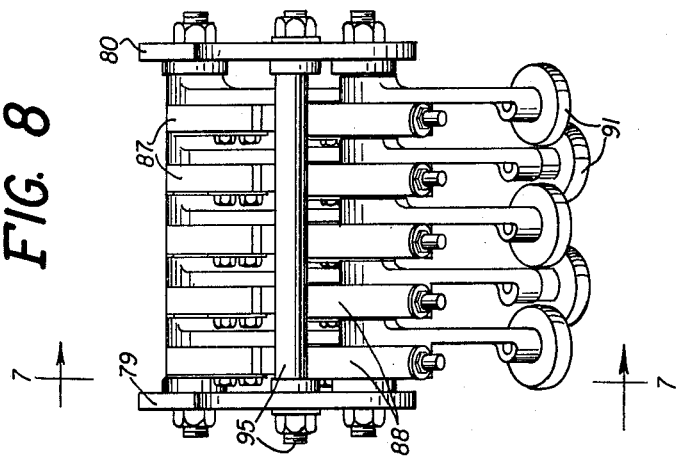
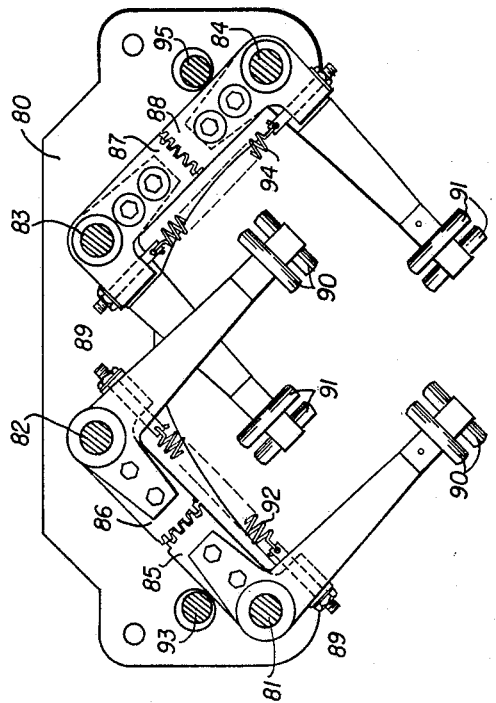

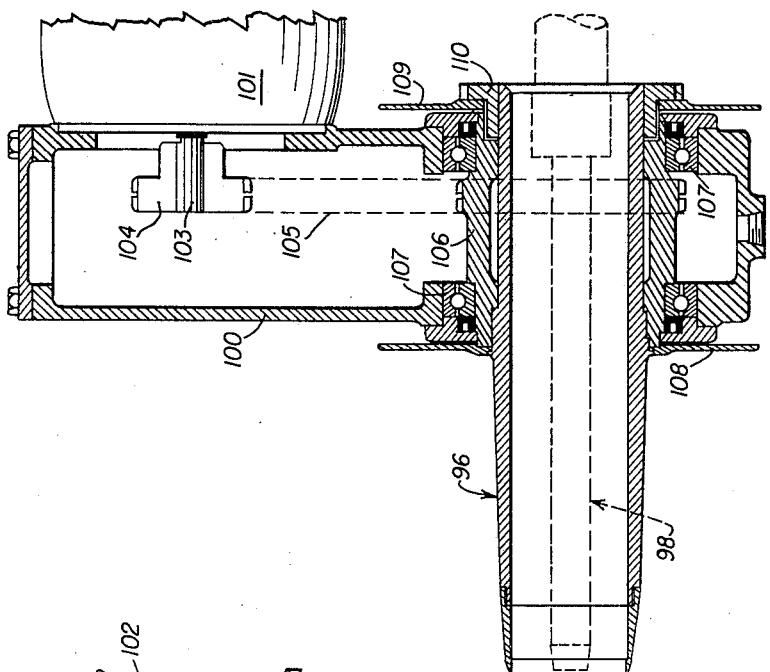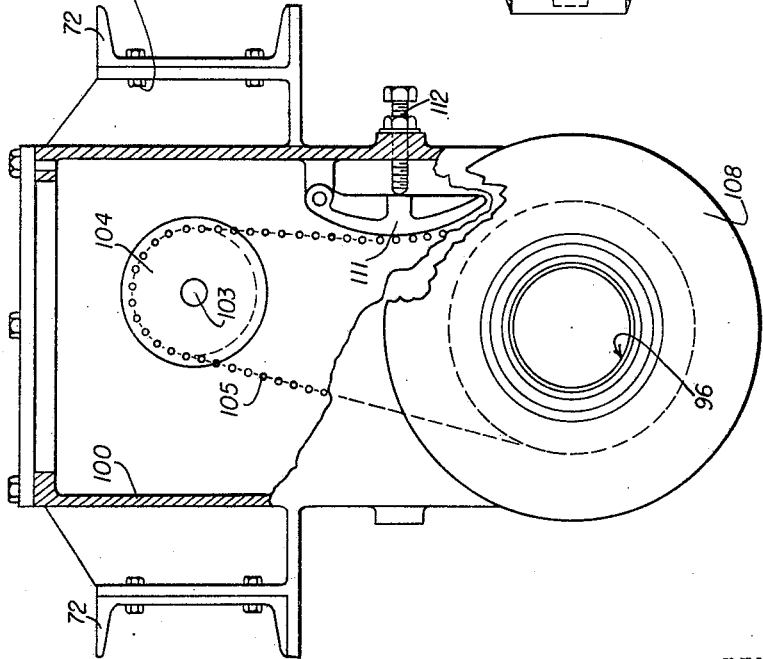

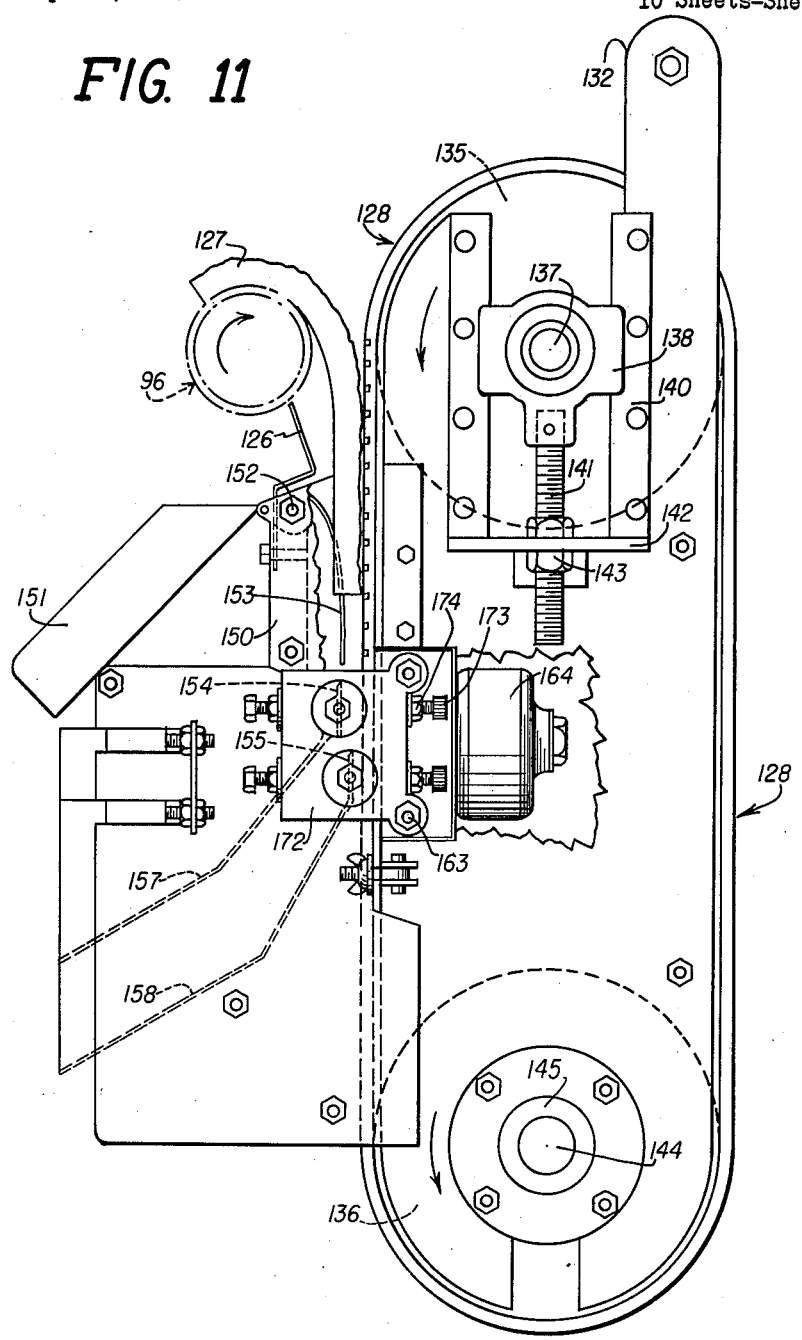

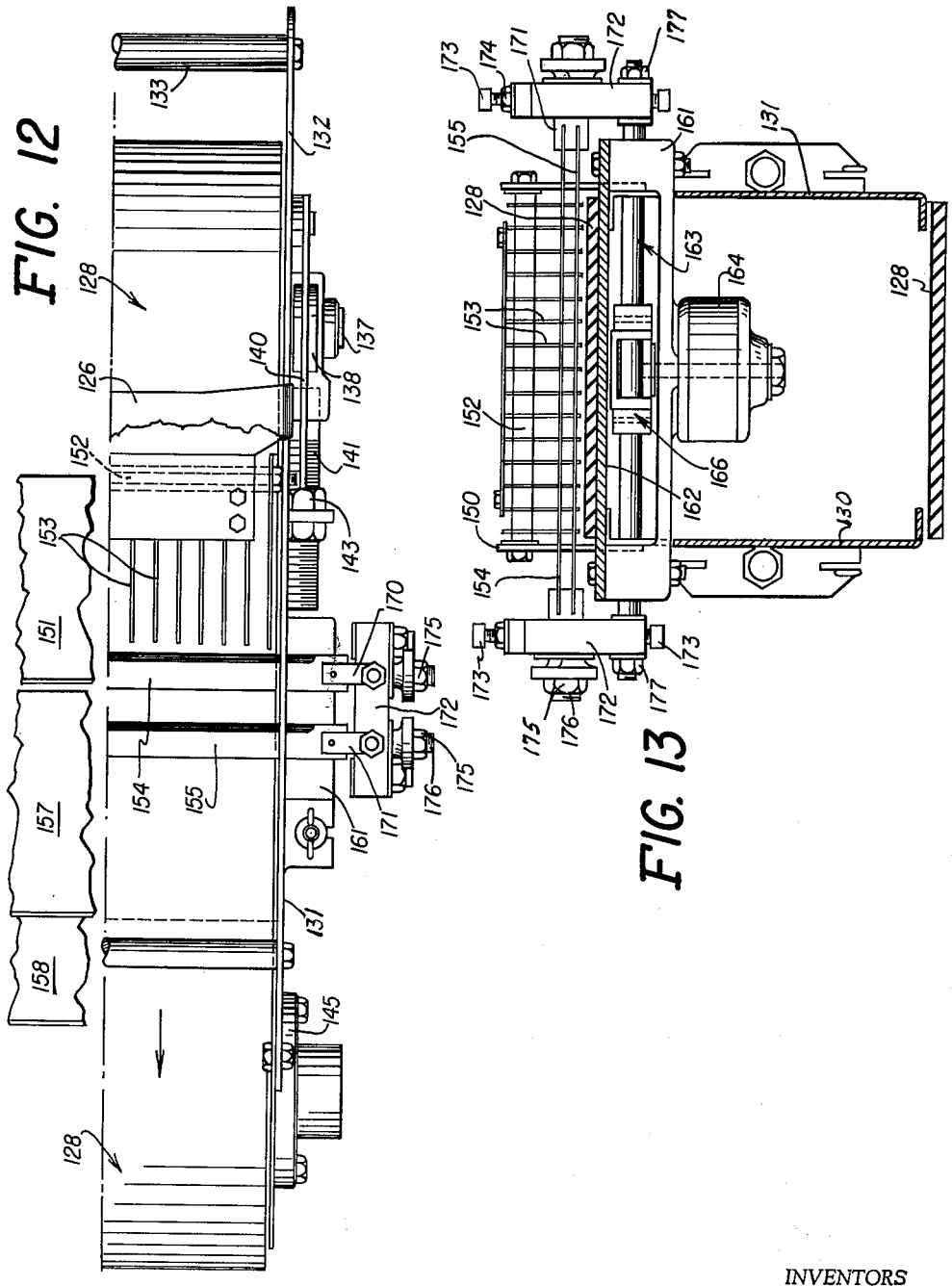

2,073,366
PINEAPPLE PROCESSING MACHINE
Houghton Sawyer, Jr., and Kenneth Tamotsu Yoshiura, Honolulu, Hawaii, assignors to Libby, McNeill & Libby, Chicago, Ill., a corporation of Maine
Filed Sept. 9, 1958, Ser. No. 759,914
11 Claims. (Cl. 146—6)

The invention relates to a fruit processing machine for preparing fruit for canning and has reference in particular to a machine for processing pineapples by first cutting the fruit to remove the top and butt ends, which will then trim the remainder of the pineapple by means of a rotating sizing knife and a center borer to remove the outer skin and simultaneously core the pineapple, and which will finally subject the outer skin to a cutting operation in order to salvage a portion of the fruit adhering thereto.

An object of the invention resides in the provision of improved apparatus which will automatically process pineapples in a relatively simple but rapid manner to produce a cylinder of fruit suitable for immediate canning or which can be canned following the conventional operation of cutting the cylinder into slices.

Another object of the invention is to provide a pineapple processing machine which will incorporate conveyor mechanism for intermittently feeding pineapples to rotating cutting knives for trimming the fruit by removing the top and bottom ends at respective stations. The conveyor mechanism additionally embodies power means for positioning the fruit laterally of the conveyor and into contact with adjustable gauge plates whereby to properly locate the fruit with respect to the cutting knives.

Another object of the invention resides in the provision of a rotary sizing knife and coring tube combined with centering head mechanism and a reciprocating plunger for feeding the pineapple, with its top and butt ends removed, into and through the centering head and into contact with the sizing knife and coring tube, the latter elements operating simultaneously to remove the skin from the pineapple and to core the same centrally.

A more specific object of the invention is to provide a sizing knife and coring tube combination wherein the coring tube is adapted to reciprocate on the rotary axis of the sizing knife for coring the fruit when in operative position within the knife and for stripping the cored fruit therefrom by its movement into an inoperative position.

The core tube functions as the piston rod of its power cylinder and the cores remain inside the tube until ejected from the rear as a result of a core entering the forward end. Accordingly, another object is to provide a sizing knife and core tube combination wherein the core tube performs a dual function, namely that of coring the fruit and simultaneously supporting the same to facilitate the cutting action thereon by the sizing knife and which will continue to support the cylinder of fruit until the same is withdrawn from the sizing knife and stripped from the tube.

A further object is to provide eradicator mechanism of novel design and which will have improved operation for slitting the skin lengthwise simultaneously with the trimming of the pineapple by the rotary sizing knife, and which will then slice from the skin one or two layers of fruit by means of high speed reciprocating knives while the skin is retained on a moving belt.

With these and other objects in view, the invention may consist of certain novel features of construction and operation as will be more fully described and particularly pointed out in the specification, drawings and claims appended thereto.

In the drawings which illustrate an embodiment of the invention and wherein like reference characters are used to designate like parts:

FIGURE 5 is an end elevational view of the processing machine of the invention taken substantially along line 5—5 of FIGURE 4 and showing the power cylinder for moving individual pineapples through the centering head and into contact with the rotary sizing knife and coring tube;

FIGURE 6 is a side elevational view showing the supporting framework for the rotary sizing knife and associated elements;

FIGURE 7 is a front elevational view of the centering head structure taken substantially along line 7—7 of FIGURE 8, with parts being shown in section;

FIGURE 8 is a side elevational view of the centering head structure shown in FIGURE 7;

FIGURE 9 is an elevational view, parts being shown in section, of the rotary sizing knife and the power means for rotating the same;

FIGURE 10 is a sectional view taken substantially through the center of the sizing knife structure as shown in FIGURE 9;

FIGURE 11 is a side elevational view of the eradicator mechanism of the invention, the same illustrating the journalling means for the eradicator belt, the reciprocating knives and the hold-down grids;

FIGURE 12 is a side elevational view of the eradicator structure shown in FIGURE 11;

FIGURE 13 is a transverse sectional view of the said eradicator structure showing the air motor and mechanism for reciprocating the cutting knives;

FIGURE 14 is a longitudinal sectional view taken through a pineapple in order to illustrate the manner of processing the same by the machine of the invention;

FIGURE 15 is a detail sectional view showing the layers of the fruit which are removed from the skin by the knives of the eradicator mechanism;

FIGURE 16 is a fragmentary plan view of the top surface of the eradicator belt;

FIGURE 18 is a vertical sectional view taken substantially along line 18—18 of FIGURE 6 and illustrating the electric means for actuating the dividing vane.

Figure 1:
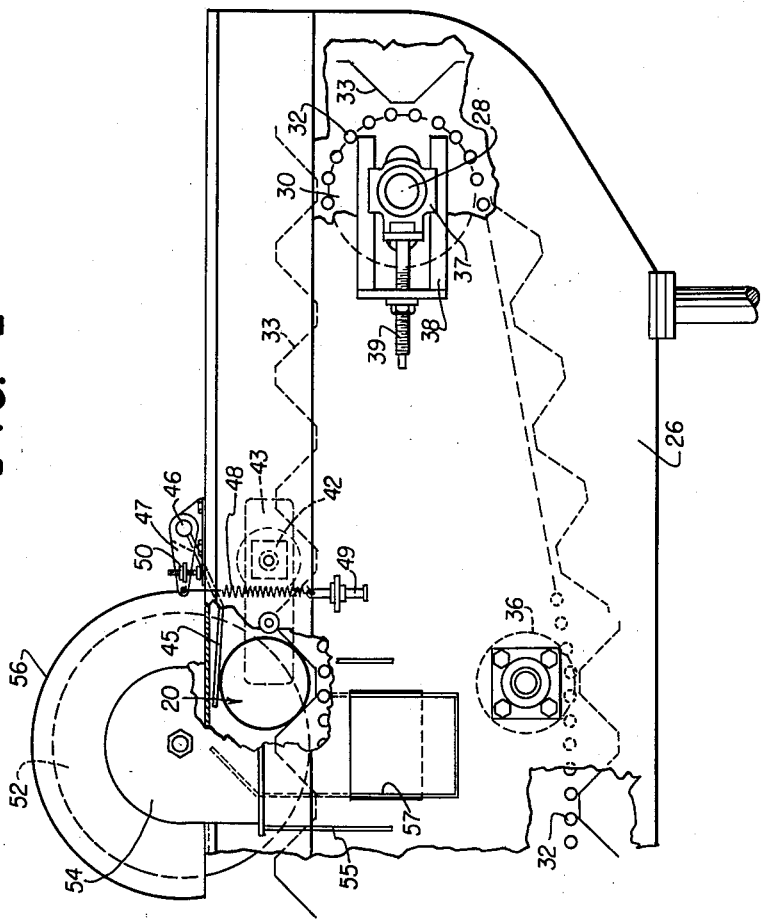
FIGURE 1 is a fragmentary side elevation of the rear half of the conveyor mechanism of the invention, the same providing a twin roller chain carrying a plurality of fixtures for supporting the pineapples.

The conveyor mechanism as shown in FIGURES 1, 2, 3 and 5 is designed to feed the pineapples intermittently and thus the conveyor has movement and then remains stationary for a period, the latter being timed so as to locate the individual pineapples at various stations in a sequential manner. At these stations the top and butt ends of the pineapple are trimmed and the same drop into the side chutes for discharge. Thus the pineapple 20, FIGURE 14, has the ends 21 and 22 sliced off as the first operation in processing the same for canning.

The remainder of the fruit is then subjected to a circular sizing knife, FIGURE 10, and to a central coring tube which produces a cylinder of fruit such as indicated by numeral 23. The skin 24 is subjected to another cutting operation performed by the eradicator mechanism of FIGURE 11 and which salvages some of the fruit adhering to the skin. The cores 25 are discharged at the rear of the coring tube as a result of core pieces entering the forward end of the tube.

*Conveyor Structure*

The side frames 26 and 27, FIGURE 5, extend longitudinally for the length of the conveyor and said frame journals at respective ends the sprocket shafts 28 and 29 to which a pair of sprockets are fixed as indicated by numerals 30 and 31, respectively. Endless roller chains 32 pass over the sprockets and for supporting the pineapples the chains carry the fixtures 33 and which are preferably spaced on centers approximately seven and one-half inches apart. The chain and fixture mechanism is driven intermittently by a variable speed rotary feed table enclosed within housing 34 and having connection with the sprocket shaft 29. Each operation moves the chain and fixture mechanism a distance of about seven and one-half inches and then dwells for a predetermined period of time during which the pineapples are moved transversely into contact with adjustable gauge plates. The top run of the chain conveyor is preferably supported by the longitudinally extending partition plate 35, whereas idler sprockets such as 36 engage with and control the bottom run of the chain conveyor. Shaft 28 is journalled by members 37 adjustably carried by the yokes 38 fixed to the side frames, respectively. By rotating the threaded screw 39 it is possible to control the tension exerted on the roller chains and to take up any slack such as may develop from wear.

Figure 3:
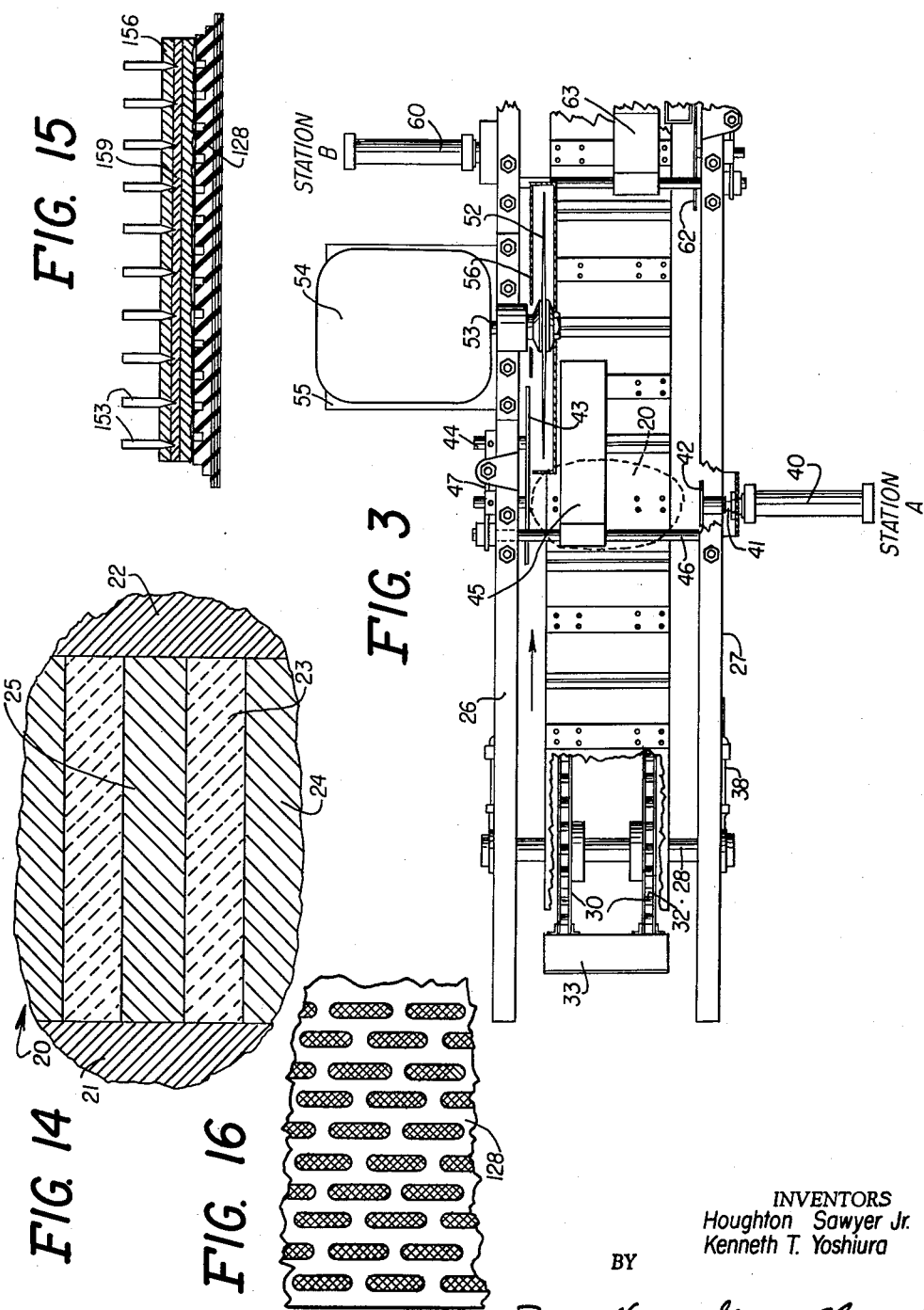
FIGURE 3 is a fragmentary top plan view of the conveyor mechanism of FIGURES 1 and 2, the said figure showing the cutting knives and the associated relation therewith of the power cylinders for individually positioning the pineapples in contact with the gauge plates.

The pineapples are graded to size before being placed in a fixture 33 of the conveyor structure. At stations A and B, FIGURE 3, the conveyor remains stationary for the dwell period and at these stations the pineapple is acted on by power cylinders to properly position the fruit for slicing the ends. Accordingly, at station A the power cylinder 40, fixed to side frame 27 and having the plunger 41, is adapted to operate the pusher plate 42 in a direction transversely of the chain conveyor so as to position the pineapple 20 into contact with the adjustable gauge plate 43. As best shown in FIGURE 3, the gauge plate is fixed to the side frame 26 as by members 44 and is of course adjustable with respect to the slicing knife 52, to be presently described in detail. At station A there is also located the hold-down plate 45 which is fixed to the pivot rod 46 extending transversely of and being journalled by the side frames. One projecting end of the pivot rod 46, FIGURE 1, is provided with the lever arm 47 and which is tensioned by the coil spring 48 fixed at one end to the arm and anchored at its other end to frame 26 by the adjustment fixture 49. The numeral 50 indicates an adjustable stop for the lever arm 47 and thus the hold-down plate 45 is properly positioned for contact with a pineapple as the same is moved under the plate during movement of the chain conveyor. Also the hold-down tension exerted by the plate can be adjusted by regulation of fixture 49.

On side frame 26 between stations A and B there is located the slicing knife 52. Said knife is suitably fixed to shaft 53 of the electric motor 54 supported by platform 55. The portion of the knife above the top of frame 26 is covered by the circular guard 56, FIGURE 1, for protection purposes. However, below the top of side frame 26 the cutting knife 52 is effective for slicing one end of the pineapple during movement of the chain conveyor between dwell periods. When completely sliced from the pineapple the end falls into chute 57 extending through side frame 26 for convenient disposal, or for further processing.

Figure 2:
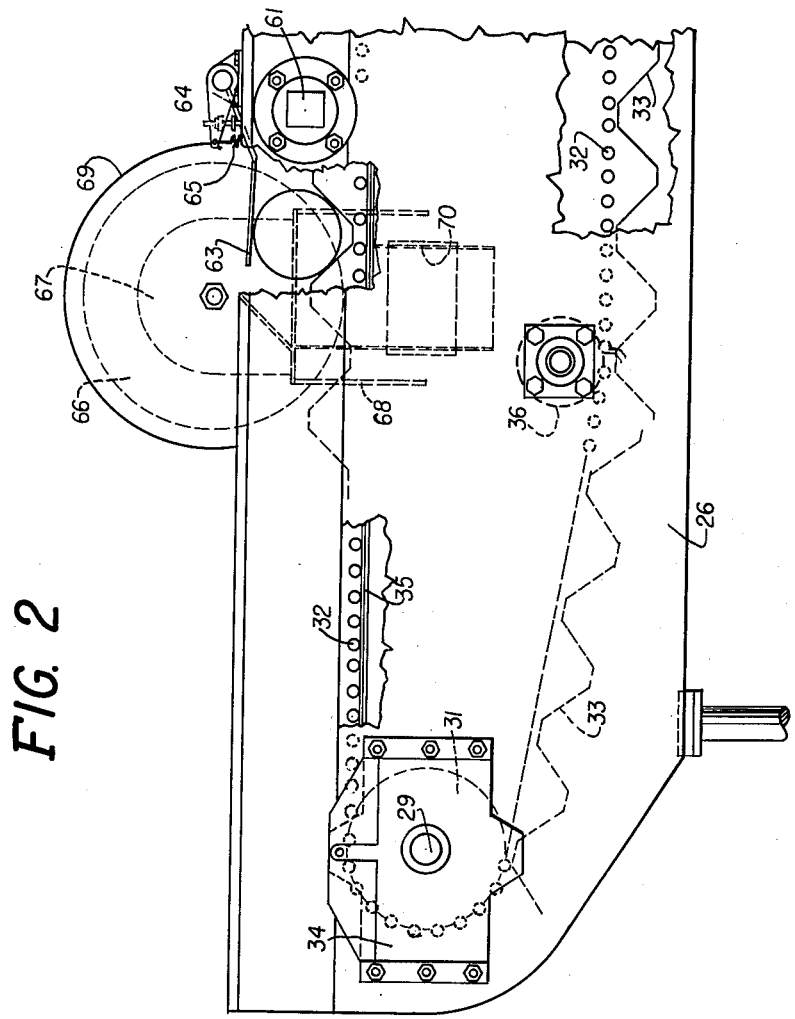
FIGURE 2 is a fragmentary side elevation of the forward half of the conveyor mechanism.

At station B a second power cylinder 60 is fixed to side frame 26 and said cylinder, through its plunger, actuates a pusher plate 61, FIGURE 2, which moves the pineapple transversely into contact with another gauge plate 62. The said gauge plate is adjustably fixed to side frame 27 in a manner as previously described for gauge plate 43 and likewise a hold-down plate 63 is provided, the same being tensioned by lever arm 64 and coil spring 65, FIGURE 2, for holding the pineapple during the second slicing operation. This second slicing operation for removing the other end of the pineapple is effected by the rotary knife 66, FIGURE 2, powered by the electric motor 67, and which is supported by the platform 68. The knife is partly covered by the guard 69 and the cut end is discharged through the chute 70. Following the second slicing operation the chain conveyor will eventually position the pineapple in alignment with a pusher cylinder which operates to move the pineapple through centering head mechanism and into contact with the circular sizing knife, which structure will now be described.

*Sizing Knife and Coring Tube*

Figure 4:
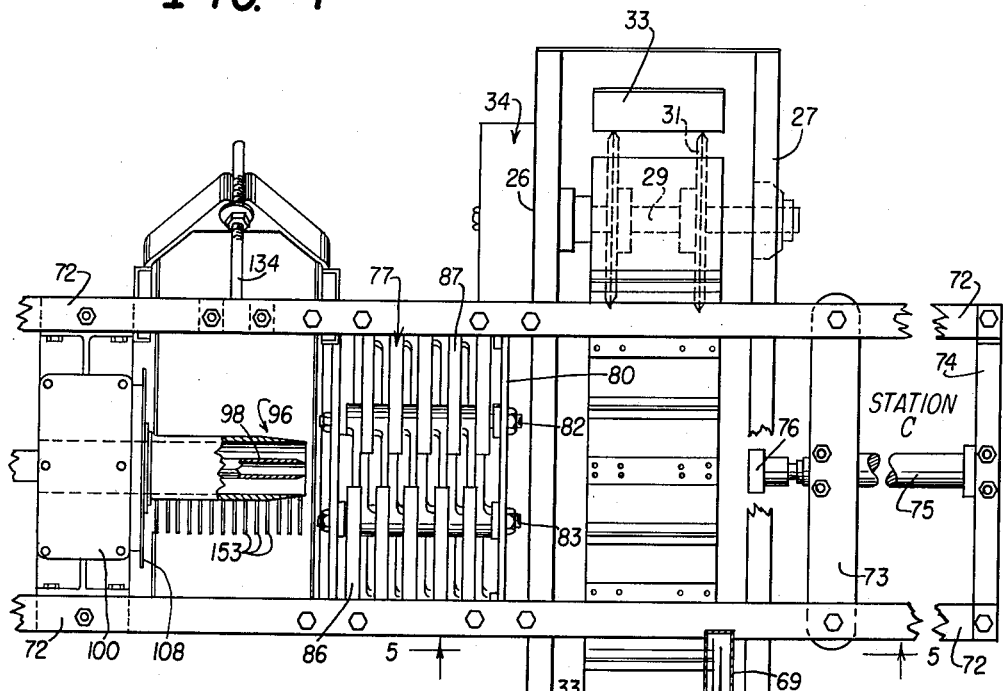
FIGURE 4 is a top plan view of the pineapple processing machine of the invention with the exception of that part of the conveyor structure shown in FIGURE 3.

The framework, including the longitudinal beams 72 and the cross beams 73 and 74, has interconnecting relation with the side frames of the conveyor, as shown in FIGURE 4, and said framework provides the support for the feed cylinder 75. The said cylinder is located at station C and upon actuation of said power cylinder its plunger 76 will contact the pineapple supported in that fixture 33 which is aligned in a transverse direction with the plunger 76 during a dwell period of the conveyor. The plunger is effective to move the pineapple from the fixture and into contact with and through the centering head mechanism, generally indicated by numeral 77, FIGURES 4 and 5. Brackets 78 depend from the longitudinal beams 72 and said brackets support the front and rear face plates 79 and 80 of the centering mechanism. The face plates are connected by four spaced finger shafts 81, 82, 83 and 84, FIGURES 7 and 8, and it will be observed that each shaft journals a number of gear quadrants 85, 86, 87 and 88, respectively. The quadrants 85 and 86 have meshing relation with each other and said quadrants provide the rollers 90. In a similar manner the quadrants 87 and 88 have meshing relation and they provide the rollers 91 which have an opposed relation to the rollers 90. The quadrants 85 and 86 are connected by the coil springs 92 in a manner to draw the rollers 90 toward each other. However, the eccentric adjusting bar 93 acts as a stop and by adjusting the same the normal spacing between the rollers can be varied. Also the quadrants 87 and 88 are connected by the coil spring 94, whereas, the eccentric bar 95 acts as a stop for the same.

The pineapple, by being pushed through the center head mechanism 77, is accurately aligned for the next cutting operation since the rollers 90 and 91 of the mechanism function in a coacting manner to maintain the pineapple centered with respect to the longitudinal axis of the sizing knife and coring tube. The spring tension on the quadrants can be varied by adjustment of the nuts 89 so that greater or lesser roller pressure may be exerted against the skin of the fruit, depending upon the fruit diameter.

Referring to FIGURES 6, 9 and 10, it will be observed that the annular sizing knife 96 is journalled for rotation by the casing 100 and which has a fixed relation with the housing of the electric motor 101, the said motor providing the power for rotating the sizing knife. Casing 100 is suitably secured, as by means of the securing bolts 102, to the longitudinal beams 72 so as to depend therefrom and locate the sizing knife on the longitudinal axis of the centering head mechanism, which is in turn longitudinally aligned with the feed cylinder 75. The drive shaft 103 of the electric motor has suitably keyed thereto the sprocket 104 which connects with the endless chain drive 105 for rotating the sizing knife 96 through the instrumentality of the sleeve 106. The said sleeve is suitably mounted on and fixed to the trunnion portion of the sizing knife and said sleeve on respective sides carries one member of the ball bearing devices 107 which journal the sizing knife for substantially frictionless rotation, the other member of the ball bearing devices being carried by the casing 100. The sizing knife 96 is provided with the front slinger disc 108 and with the rear slinger disc 109, the latter being retained by the adjusting collar 110. For taking up slack such as may develop in the chain drive 105, the casing 100 on the inside thereof may be provided with the pivoted shoe 111 and with the adjusting bolt 112.

Simultaneously with the sizing of the pineapple by the circular knife 96 the pineapple is cored centrally by means of the coring tube 98. The said tube forms part of the piston rod such as 113 associated with the power cylinder 114. In fact, the coring tube extends completely through the power cylinder 114 in all operative positions of its plunger since as the cores enter the coring tube at its forward end the cores are discharged from the tube at the end 115 which projects beyond the cylinder 114, as best shown in FIGURE 6. The power cylinder is suitably supported from the longitudinal beam 72 as by means of the depending brackets 116 and 117 and said cylinder is so located that the coring tube 98 is concentric with respect to the circular sizing knife 96, being located on its rotary axis and in horizontal alignment with the plunger of the feed cylinder.

*Stripping Device*

The coring tube 98 cores the pineapple centrally thereof and in so doing causes the discharge of a core from the end of the tube beyond its power cylinder 114. The cylinder of fruit 23, as described in connection with FIGURE 14, will have location within the circular sizing knife, being supported thereby and by the coring tube. For removing the cylinder of fruit from the sizing knife and from the coring tube, the power cylinder 114 is actuated to retract the tube and the action is controlled so as to materially reduce the speed of the returning stroke to prevent the pineapple from being stripped from the core tube before the pineapple reaches the stripping plate 118. It will be noted that the inside surface of the tubular knife 96 is smooth and relieved to a greater diameter than the sizing knife cutting edge so as to facilitate the retraction of the cylinder of fruit, during which time the same is supported on the coring tube. When the plunger of the power cylinder has retracted to an extent to cause the pineapple to contact the stripping plate 118, any further returning movement of the coring tube will of course strip said pineapple from the tube, whereupon the same falls into the chute 120 located immediately below stripper plate 118. The plate 118 is fixed to the member 119 which functions as a suspending bracket for the chute. The chute 120 is preferably provided with a dividing vane 121 for directing the pineapple cylinders to one side or the other of the chute. The vane is fixed to the rotatable shaft 122 having the control lever 123 and which is actuated by the solenoid 178. From the chute 120 the pineapple cylinders are deposited onto the conveyor belt 124 supported at the end adjacent the chute by the roller 125.

*Eradicator Mechanism*

As the pineapple is trimmed by the sizing knife 96, the skin 24, FIGURE 14, is simultaneously cut lengthwise of the pineapple by the slitter knife 126, FIGURE 11, and thus a length of pineapple skin 127 is produced and which is thrown by centrifugal force onto the surface of the eradicator belt 128 with the fruit side facing out. The framework for the eradicator mechanism essentially consists of the side members 130 and 131, FIGURES 5, 11 and 12, with the members each having an extension 132 and which are joined by the cross bar 133. The cross bar is instrumental in supporting the mechanism from the longitudinal beams 72 by means of the eradicator mechanism adjusting screw 134, as best shown in FIGURES 4 and 5. The side members journal the rollers 135 and 136 at respective ends and said rollers support the endless eradicator belt 128 for movement and which belt is driven at a relatively high speed by roller 136. The top roller 135 is mounted for rotation by shaft 137 and by bearing 138, the said bearings being positioned on guides 140 and being adjustable thereon in order to take up any slack in the eradicator belt, thus maintaining the proper tension on the belt. Adjustment is effected by screw 141, fixed at one end to the bearing 138 and at its opposite end to the flange 142 of the guides by the jamb nuts 143. The bottom roller 136, having the shaft 144, journalled in the side members by bearings 145 and which are supported by struts 146 connecting with the longitudinal beam 147, FIGURE 5. The electric motor 148, as shown in FIGURE 6, provides the power for moving the eradicator belt by driving the bottom roller 136.

Figure 17:
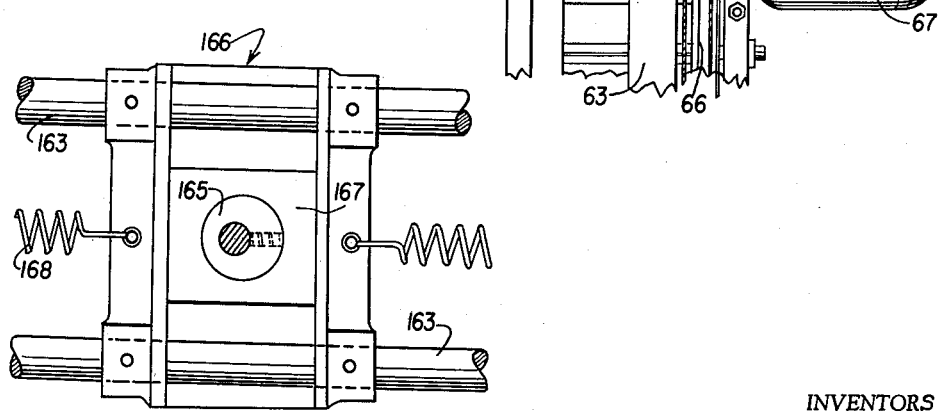
FIGURE 17 is a vertical sectional view showing the eccentric cam means for reciprocating the knives of the eradicator mechanism.

The slitter knife 126 is supported by side plates 150 and transverse stud shaft 152 which also provide the support for the trash chute 151. The shaft 152 has the hold-down grids 153 fastened thereto and said grids serve to hold the length of pineapple skin 127 with the skin side against the eradicator belt until said belt feeds said length of pineapple into contact with the vibrating knives 154 and 155. The grid bars may be adjusted to be predetermined height over the eradicator belt and since the bottom edges of the grids are reasonably sharp they cut into the fruit adhering to the pineapple skin and in this manner the length of the pineapple skin 127 is controlled and held in contact with the eradicator belt for eventual slicing by the vibrating knives 154 and 155. The top knife 154 slices the top portion of fruit 156, FIGURE 15, and the said first cut is discharged into chute 157. The bottom knife 155 slices the second cut, which is discharged into the chute 158. Referring more particularly to FIGURE 13, it will be observed that the frame members 130 and 131 are suitably connected by bracket 161, which has secured thereto the plate 162, the same providing a supporting surface for the top run of the eradicator belt 128. The bracket 161 also supports the reciprocating cross head comprising the rods 163 for movement and which is effected by the air motor 164 through the instrumentality of the eccentric cam 165. As best shown in FIGURE 17, the slotted yoke 166 is mounted on the reciprocating cross head 163 so as to reciprocate therewith. The shaft of the air motor 164 carries the eccentric cam 165 which is located within the cam slide block 167. As the slide block is free to slide in a back and forth direction only, it imparts reciprocating motion to the cross head, first in a direction toward the left and then in a direction toward the right, as will be well understood. The motor 164 is conveniently supported from the bracket 161 and in order to dampen the reciprocating movements of the cross head adjustable tension dampening springs 168 are provided, the said springs absorbing the energy of the cross head at high speeds.

The knives 154 and 155 are disposed in parallel relation to the surface of the belt and they extend transversely of said belt. Said knives at each end are secured respectively to squared fixtures 170 and 171 and which in turn are carried by the adjusting blocks 172. The fixtures have a squared shank which extends through a squared opening in the blocks so that the fixtures will not turn with respect to the blocks but will, however, be adjustable by means of the adjusting screws 173. After the knives have been adjusted at a desired distance over the eradicator belt the squared fixtures are tightened and locked in place by rotating the screws 173 and which are then locked in adjusted position by the jamb nuts 174. The tension applied to the knives can be adjusted individually by rotating the nuts 175 on the threaded end 176 of the squared fixtures. It will be understood, of course, that the knives are vibrated by the reciprocating cross head 163 and accordingly the adjusting blocks 172 are fixedly secured to the rods 163 comprising the said cross head mechanism. The ends of the rods 163 are threaded and shouldered for receiving the adjusting blocks and which are then securely locked to the rods by the nuts 177.

In operation of the eradicator mechanism the knives 154 and 155 are vibrated at a relatively high speed and the length of pineapple skin produced by the sizing knife and the slitter knife is fed to said knives by the fast moving eradicator belt. As the belt picks up the length of pineapple skin it is conveyed under the adjustable hold-down grids and as a result the skin is pressed flat against the surface of the belt. Since the knives are secured to a common reciprocating frame they vibrate in unison with the first cut being removed by knife 154. Since the fruit of the first cut is closest to the pineapple cylindrer, this material is used for pineapple crushed. The second slice is cut by knife 155, and since this fruit is closest to the skin, the fruit is used together with the cores and other usable trim for producing juice.

*Operation*

The operation of the pineapple processing machine is basically timed with the dwell periods of the chain conveyor 32 and which alternate with those periods of the conveyor wherein the same has movement to feed the pineapples to the circular cutting knives for trimming the top and butt ends. Eventually the pineapples reach station C, FIGURES 4 and 5, and during a dwell period the feed cylinder 75 is rendered operative to move the partly processed pineapple through the centering head mechanism 77 and into operative contact with the sizing knife 96 and the coring tube 98. Prior to the dwell periods the power cylinder 114 for the core tube will have located the tube in a forward position concentrically within the sizing knife. Accordingly the sizing knife and coring tube are both operative during the dwell periods for further proceesing the fruit by trimming the skin from the same and by coring to produce a cylinder of fruit 23, FIGURE 14. Upon completion of these operations the plunger 76 of the feed cylinder 75 is retracted and the chain conveyor is again actuated to progress the pineapples supported by the fixtures 33. Movement of the eradicator belt 128 is continuous during the operation of the machine and likewise the knives 154 and 155 vibrate continuously. However, the skin removed from the pineapple is delivered to the eradicator mechanism following complete cutting of the skin by both the sizing knife and the coring knife.

The mechanism therefore makes use of integrated power cylinders and coacting elements for trimming both ends of the pineapple, for centering the same, and for sizing and coring. By coring the pineapple during the sizing operation, and while the same is supported by the sizing knife, more accurate coring can be obtained. Also since these two operations take place simultaneously following removal of the top and butt ends of the pineapple, the machine is considerably simplified. Further simplification of the machine has been obtained by employing a fast moving eradicator belt in combination with vibrating knives for salvaging some of the fruit adhering to the skin of the pineapple.

The dividing vane 121 is effective to deliver pineapple cylinders to the left side or to the right side of the belt conveyor 124, depending on the position of the vane. Energization of the solenoid 178 to change the position of the dividing vane can be accomplished manually by the operator or the terminals of the solenoid can be electrically connected to certain elements of the machine for automatic operation.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a pineapple processing machine, in combination, a conveyor providing a plurality of fixtures having their transverse axes spaced equal distances apart, said fixtures being adapted to support the pineapples to be processed, means for driving the conveyor intermittently and to an extent for each movement equal to the spaced apart distance of the fixtures, whereby the pineapples have periods of movement which alternate with dwell periods to thus progressively locate the pineapples at stations longitudinally of the conveyor, pusher means at certain stations for positioning the pineapples transversely of their respective fixture during a dwell period, a rotating circular knife on each side of the conveyor for trimming the respective ends of the pineapple so positioned by the pusher means, a feed cylinder at another station of the conveyor beyond the circular knives and in horizontal alignment with the transverse axis of the fixtures when located at said station during a dwell period, an annular sizing knife for trimming the pineapples circumferentially, means supporting the sizing knife with its rotary axis in alignment with the feed cylinder and with its cutting edge directed toward the cylinder, whereby actuation of the feed cylinder removes a pineapple from its fixture and feeds the same into contact with the sizing knife, a coring tube mounted for reciprocating movement on the rotary axis of the sizing knife to and from an operative position within the sizing knife and an inoperative position located rearwardly of the sizing knife opposite its cutting edge, and a stripper plate in associated relation with the coring tube and located on the opposite side of the sizing knife from its cutting edge.

2. A pineapple processing machine as defined by claim 1, additionally including eradicator mechanism in associated relation with the sizing knife, said mechanism comprising a slitter knife for slitting longitudinally the skin of the pineapple as produced by the sizing knife, a moving belt for receiving the skin following the slitting operation and for effecting movement of the same in an approximately straight path with the fruit side facing out, and vibrating knives for cutting slices of fruit from the skin during movement of the same in said approximately straight path.

3. In a pineapple processing machine, in combination, a conveyor including spaced frame members journalling a sprocket shaft at each end, endless chain mechanism supported by the sprocket shafts and adapted to be driven thereby, a plurality of fixtures secured at regular intervals to the endless chain mechanism for supporting the pineapples to be processed, means for driving the endless chain mechanism intermittently and to an extent for each movement equal to the regular intervals, whereby the pineapples have periods of movement which alternate with dwell periods to thus progressively locate the pineapples at stations longitudinally of the conveyor, a power cylinder at certain stations for positioning the pineapples transversely of their fixture, a rotating circular knife located immediately beyond each power cylinder station for trimming the respective ends of the pineapples so positioned, an annular sizing kife supported for rotation on a horizontal axis, a feed cylinder at another station of the conveyor beyond the circular knives and in horizontal alignment with the rotary axis of the sizing knife, said sizing knife having its cutting edge directed toward the feed cylinder, whereby operation of the feed cylinder during a dwell period will remove a pineapple from its fixture and feed the same into contact with the sizing knife for trimming the outer skin from the pineapple, and a coring tube mounted for movement on said rotary axis to and from an operative position within the sizing knife and an inoperative position located to that side of the sizing knife opposite its cutting edge, the sizing knife adjacent its rear end having a greater inside diameter than that of its cutting edge whereby to facilitate extraction of the cylinder of pineapple by the coring tube.

4. In a pineapple processing machine, the combination with a conveyor for intermittently moving the pineapples to be processed from station to station for the length of the conveyor, means located immediately beyond certain stations for trimming the ends of the pineapples during movement thereof by the conveyor, a feed cylinder at another station located beyond the trimming means, said cylinder having a plunger adapted to be actuated thereby in a direction transversely of the conveyor and between movements of the conveyor, an annular sizing knife disposed in horizontal alignment with said plunger and having its cutting edge directed toward the plunger, a coring tube operatively positioned concentrically within the sizing knife, whereby the trimmed pineapples are moved from the conveyor by the plunger and caused to contact the sizing knife and coring tube for simultaneous sizing and coring, power means for reciprocating the coring tube to and from operative position within the sizing knife and an inoperative position rearwardly of the sizing knife, a stripper plate for removing the cylinder of fruit from the coring tube as the tube is moved into an inoperative position, a dividing vane located below the stripper plate for directing the removed cylinder of fruit to one side or the other of a chute depending on the position of the dividing vane, and power means for selectively positioning the said dividing vane.

5. In a pineapple processing machine, the combination with a feed cylinder for feeding trimmed pineapples along a horizontal path, a tubular sizing knife mounted for rotation on an axis aligned with said horizontal path, whereby the trimmed pineapples are fed by the cylinder into contact with the sizing knife for a sizing operation thereon, a coring tube disposed on the rotary axis of the sizing knife and supported for reciprocating movement to and from an operative position concentrically within the sizing knife and an inoperative position located on the side of the knife opposite its cutting edge, power means for reciprocating the said coring tube, a stripper plate for removing the cylinder of fruit from the coring tube as the tube is moved into an inoperative position, a dividing vane located below the stripper plate for directing the removed cylinder of fruit to one side or the other depending on the position of the dividing vane, and electric means for selectively positioning the said dividing vane.

6. In a pineapple processing machine, in combination, a tubular sizing knife mounted for rotation on a horizontal axis and presenting an annular cutting edge, means for feeding a trimmed pineapple into contact with the cutting edge for sizing the pineapple whereby a cylinder of fruit is positioned within the tubular sizing knife, a coring tube disposed on the rotary axis of the sizing knife and supported for reciprocating movement to and from an operative position concentrically within the sizing knife and an inoperative position located on the side of the knife opposite its cutting edge, power means for reciprocating the said coring tube, a stripper plate located between the said power means and the sizing knife for removing the cylinder of fruit from the coring tube as the tube is moved into an inoperative position, a chute positioned below the stripper plate and having a dividing vane for directing the removed cylinder of fruit to one side or the other of the chute depending on the position of the dividing vane, and power means for selectively positioning the dividing vane.

7. In a pineapple processing machine, in combination, a conveyor providing a plurality of fixtures for individually supporting the pineapples to be processed, means for driving the conveyor intermittently so that the pineapples have periods of movement which alternate with dwell periods, power means at certain locations longitudinally of the conveyor and which align with the fixtures when stationary during a dwell period, an adjustable gage plate at each location and positioned on the opposite side of the conveyor in alignment with its respective power means, each power means being operative to position the pineapples transversely of the conveyor to an extent as determined by its gage plate, rotating circular knives for trimming the ends of the pineapples so positioned by the power means, an annular sizing knife supported for rotation on a horizontal axis, a coring tube also located on said horizontal axis and mounted for reciprocating movement to and from a position concentrically within the sizing knife, a feed cylinder in horizontal alignment with the coring tube and so combined with the conveyor that the trimmed pineapples are individually removed from their fixture by the feed cylinder and fed into contact with the sizing knife and coring tube, whereby the trimmed pineapples are cored centrally and sized circumferentially, a slitter knife positioned exteriorly of the sizing knife and approximately radial to its axis, said operations of coring and sizing taking place simultaneously with the cores entering the core tube and the skin of the pineapple as produced by the sizing knife being cut longitudinally by the said slitter knife, a stripper plate in associated relation with the coring tube, and means for reciprocating the said coring tube to strip therefrom the trimmed and sized pineapple as the coring tube is moved in a retracting direction away from the sizing knife.

8. In a pineapple processing machine, the combination with a conveyor for intermittently moving the pineapples to be processed from station to station for the length of the conveyor, means located immediately beyond certain stations for trimming the ends of the pineapples during movement thereof by the conveyor, a feed cylinder at another station located beyond the trimming means, said cylinder having a plunger adapted to be actuated thereby in a direction transversely of the conveyor and between movements of the conveyor, a tubular sizing knife mounted for rotation on an axis aligned with the plunger, whereby the plunger will feed pineapples from the conveyor into contact with the sizing knife, a coring tube disposed on the rotary axis of the sizing knife and mounted for reciprocation, power means for reciprocating the coring tube in directions generally opposite to that of the plunger, whereby to operatively position the coring tube concentrically within the sizing knife for coring the pineapples simultaneously with the sizing operation, and for withdrawing the coring tube in a rearward direction from the sizing knife following the sizing operation to thereby also withdraw from the sizing knife the sized cylinder of fruit in supported relation on the coring tube.

9. A pineapple processing machine comprising a conveyor, a feeder adjacent said conveyor, said feeder being movable transversely of said conveyor to transfer pineapples therefrom, a cylindrical sizing knife and a cylindrical coring tube in axial alignment with said feeder, said coring tube being movable axially with respect to said sizing knife to remove the sized and cored pineapple from said sizing knife.

10. A pineapple processing machine of the construction defined in claim 9 further characterized in that it includes a stripper for removing the cored and sized pineapple from the coring tube.

11. A pineapple processing machine of the type defined in claim 9 further characterized in that the coring tube is disposed and constructed so that the cores of the cored pineapples are removed therefrom by successive displacement of the cores, respectively.

(References on following page)

References Cited in the file of this patent

UNITED STATES PATENTS

| | | |
|---|---|---|
| 1,112,130 | Ginaca | Sept. 29, 1914 |
| 1,456,624 | Davis | May 29, 1923 |
| 1,460,559 | Opperman | July 3, 1923 |
| 1,844,810 | Taylor | Feb. 9, 1932 |
| 1,920,095 | McCall | July 25, 1933 |
| 2,023,810 | Horner | Dec. 10, 1935 |
| 2,092,786 | Taylor | Sept. 14, 1937 |
| 2,289,015 | Jackson | July 7, 1942 |
| 2,506,802 | Magnuson et al. | May 9, 1950 |
| 2,652,915 | Fox | Sept. 22, 1953 |
| 2,749,955 | Buechele | June 12, 1956 |
| 2,818,899 | De Back | Jan. 7, 1958 |
| 2,897,861 | Leslie et al. | Aug. 4, 1959 |

FOREIGN PATENTS

| | | |
|---|---|---|
| 153,508 | Australia | Oct. 2, 1953 |